United States Patent

[11] 3,627,263

[72] Inventors William Edward Warren Cuffley;
Frederick James Gallagher, Hayes, both of England
[21] Appl. No. 884,785
[22] Filed Dec. 15, 1969
[45] Patented Dec. 14, 1971
[73] Assignee Bespak Industries Limited
[32] Priority Dec. 18, 1968
[33] Great Britain
[31] 60,109/68

[54] AEROSOL VALVES
5 Claims, 1 Drawing Fig.

[52] U.S. Cl. .................................... 251/353, 222/402.24, 251/354
[51] Int. Cl. ...................................... F16k 31/58, F16k 31/524
[50] Field of Search ............................ 251/353, 354; 222/402.24, 402.25

[56] References Cited
UNITED STATES PATENTS
2,703,665  3/1955  Soffer et al. ................. 251/354 X
2,781,954  2/1957  Bretz, Jr. ..................... 222/402.24
2,881,808  4/1959  Germain ...................... 251/353 X
2,913,154  11/1959 Kuffer ......................... 251/353 X
3,098,589  7/1963  Graham ....................... 251/355 X
3,108,721  10/1963 Nebinger ..................... 222/402.25
3,506,241  4/1970  Ewald ......................... 251/354

Primary Examiner—Samuel Scott
Attorney—Lawrence E. Laubscher

ABSTRACT: The invention relates to improvements in a known form of aerosol valve having a cup-shaped valve member whose annular, upper edge normally seals against a main seal under spring pressure. The interior of the cup communicates, through radial apertures in the wall of a hollow actuator member, with the interior of the member. The valve is opened by pressing the actuator member downwardly to unseat the valve member. One improvement resides in shaping the interior surface of the valve member to guide the fluid flow radially inwardly towards the radial apertures in the actuator member. These apertures preferably account for at least 50 percent of the circumference of the actuator member. Also, flow velocity is increased by forming a progressively tapering flow passage between the valve member and the housing in which it is located.

PATENTED DEC 14 1971
3,627,263
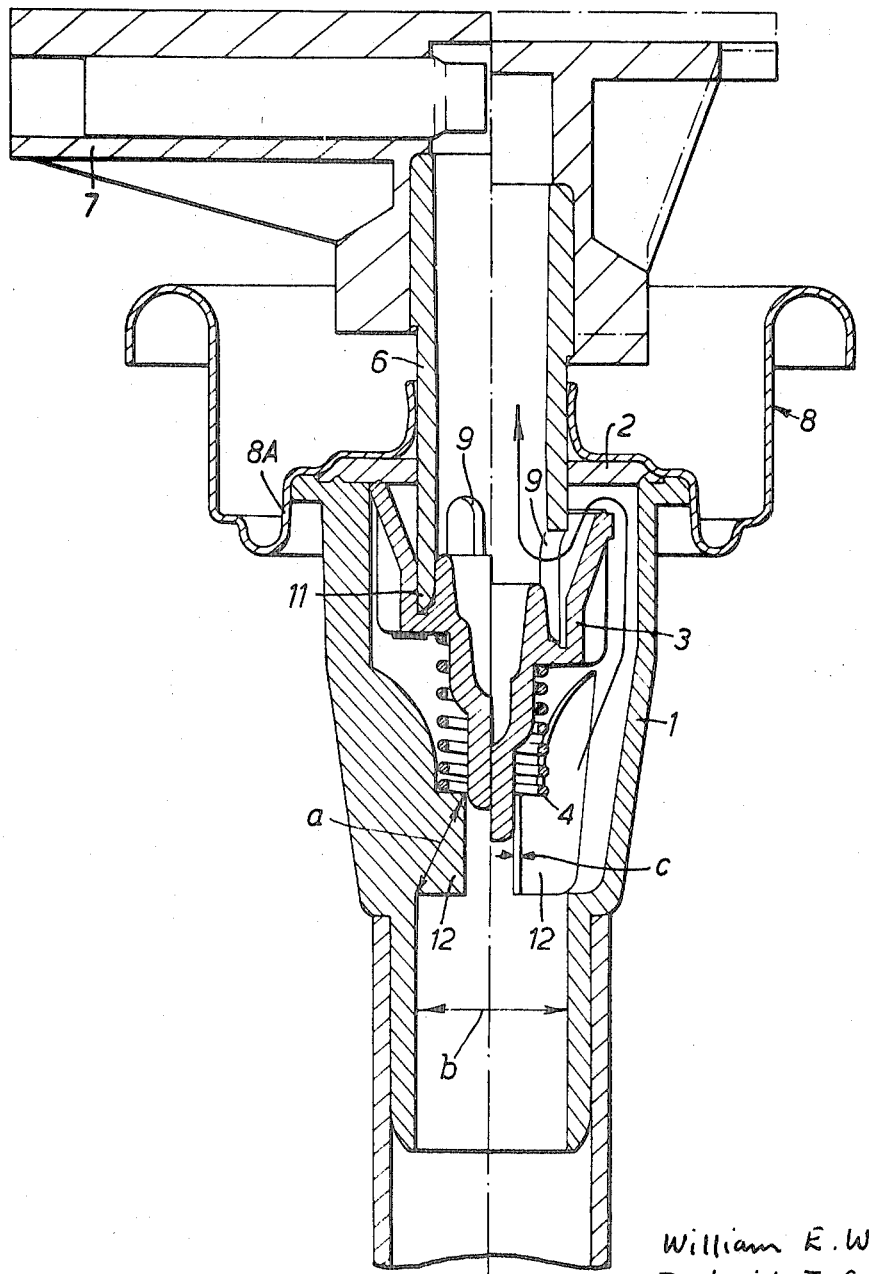
William E. Warren
Frederick J. Gallagher
INVENTORS
BY
Lawrence C. Laufscher
ATTORNEY

AEROSOL VALVES

This invention relates to so-called "aerosol" valves for pressurized containers.

The invention is particularly concerned with such valves in which a high discharge rate is a requirement.

The invention is, more particularly, concerned with aerosol valves of the form, known in itself including a valve housing defining a valve chamber and having at its lower end an inlet for pressurized material, an annular, flexible seal closing the upper end of the chamber, a hollow actuator member extending in sliding, sealed relation through the seal and having secured to it, within the valve chamber, a valve member in the form of a cup, the interior of which is in permanent communication with the interior of the actuator member through radial apertures in the wall of the actuator member, and a spring urging the valve member upwardly into sealing engagement with the said seal, the actuating member being manually movable downwardly, against the action of the spring to unseat the valve member to open the valve.

Valves of this general form are frequently used for high discharge rate requirements, but we have discovered that the discharge rate of such a valve can be increased substantially by improving the flow pattern through the valve.

In the known valves of which we are at present aware, the valve member or cup has parallel sidewalls and material entering the cup is forced to turn through an angle of 180° in passing over the edge of the cup and again in passing from the interior of the cup to the radial apertures.

In accordance with the invention the valve member of an aerosol valve of the form described above is formed with an internal surface which guides material entering the member radially inwards toward the actuating stem.

In accordance with a preferred feature the apertures in the actuating stem are positioned below but close to the plane of the upper edge of the valve member.

These arrangements make it possible to secure a flow pattern in which pressurized material is given a substantial radial component of movement from the upper edge of the valve member towards the apertures in the actuating member.

These and further features of the invention are embodied in a preferred form of aerosol valve described below by way of example only, and illustrated in axial cross section in the accompanying drawing.

The valve comprises a valve housing 1, a seal 2, a cup-shaped valve member 3 spring loaded towards the seal by a coil compression spring 4, a hollow actuator stem 6 extending in sliding, sealed engagement through the seal 2, a discharge nozzle 7 mounted on the stem and a sheet metal mounting cup 8, the outer periphery of which is shaped for connection, and subsequent attachment by crimping to a container. The mounting cup has a central boss 8A, in which is received the flange of the housing 1 and the sidewall of the boss is deformable by pressing to clamp about the flange to secure these parts together. The mounting cup also has an upstanding flange about its central hole to guide the stem 6.

In use, when the aerosol valve is assembled with a container for pressurized material, the container is normally closed by virtue of the seal made between the seal 2 and the upper edge of the valve member 3 (left-hand half of drawing). To discharge a quantity of material the stem 6 is pressed inwardly to unseat the valve member, whereupon material flows over the upper edge of the valve member to the interior thereof, then through radial apertures 9 in the stem 6 to the interior of the stem and so to the discharge nozzle (right-hand half of the drawing).

In accordance with an important feature of the present invention, the valve member 3, instead of having a parallel side wall as in conventional valves, has a frustoconical upper portion, the internal wall of which is thus adapted to give the material flowing into the valve member an inwardly radial component of flow. Furthermore, the radial apertures 9 in the stem 6 are positioned just below, but close to, the plane of the upper edge of the valve member, thus facilitating flow of material from the interior of the cup to the interior of the stem 6. The entrance to the interior of the stem is conventionally found close to the bottom of the cup-shaped valve member, so that material flowing has to turn through 180° to pass over the edge of the valve member to reach the bottom of the member and then through 180° in the reverse direction to pass into the stem 6. In the present arrangement, however, the material makes two turn each of less than 180°, as indicated by the flow arrow in the drawing, and it is believed that this factor contributes substantially to the high flow rate of the present valve.

The fact that the outer surface of the valve member is also frustoconical, and the adjacent inner surface of the housing 1 is parallel sided, results in a convergent flow passage being formed between them, and this is though to produce a substantially nonturbulent flow pattern which also assists in obtaining high flow rates.

Another feature believed to be important in this respect is the fact that the sum of the widths of the apertures 9 is not less than 50 percent of the circumference of the stem. These apertures are formed by slots extending from the lower edge of the stem, leaving the stem with three or more axially extending legs 11 which are received in an axially directed annular groove in the base of the valve member 3. Both parts are preferably made of plastics material, the resilient nature of which enables the parts to be securely attached to each other merely by pushing the legs into the groove.

The lower end of the valve spring 4 is located by radial vanes 12 formed in the lower portion of the housing and being rectangular in axial elevation. In this embodiment, these vanes have been carefully shaped and proportioned to secure minimum restriction to flow of material in this region of the housing. If the internal diameter of a bore of the housing immediately below these vanes is b, the diagonal marked on the drawing is a and the thickness of the vanes is c we prefer to secure the following ratios:

$$a/b = 0.4 \text{ to } 1.0$$
$$c/a = 0.04 \text{ to } 0.44$$

The number of vanes is preferably from 3 to 8, inclusive.

Although the valve is referred to in the foregoing description and the following claims as being vertical in use, with the actuating member uppermost, it will be understood that this is simply for convenience of description and that valves in accordance with the invention may be used in an inverted position if desired.

We claim:

1. An aerosol valve for a pressurized container; comprising
   a valve housing 1 containing a generally cylindrical valve chamber, said housing including inlet and outlet openings communicating at opposite ends with said chamber, said inlet opening being adapted for connection with a source of pressure fluid;
   flexible seal means connected with said housing for closing said outlet opening, said seal means containing an opening;
   a tubular actuator stem slidably mounted in the opening and containing at one end within the valve chamber a plurality of circumferentially spaced axially extending apertures 9 that define in said stem a plurality of axially extending leg portions;
   a cup-shaped valve member 3 connected with said one end of said actuator stem within said valve chamber, said valve member including a base portion containing an annular groove 11 that receives a frictionally retained engagement the free extremities of said valve stem leg portions, said valve member including also a frustoconical portion that diverges outwardly from said base portion concentrically about said hollow stem and terminates in an annular edge adjacent and parallel with said seal means, said annular edge being concentrically spaced from the cylindrical wall surface of said valve chamber, whereby the outer surface of said valve body cooperates with the cylindrical inner wall surface of said valve chamber to define in the direction from said inlet opening to said outlet opening a convergent flow passage, said apertures being of a length slightly greater than the depth of said groove and slightly less than the distance between the planes containing said annular edge and the free extremity of said one valve stem end, respectively, whereby said valve stem is in constant communication with the interior of said valve member and the extremities of said apertures are located immediately adjacent the plane of said annular edge; and spring means 4 biasing said valve member relative to said housing toward a closed position in which the annular edge of said valve member is in sealed engagement with said seal means to isolate said inlet opening from said outlet opening, said actuator stem being manually movable downwardly against the action of the spring means to unseat said valve member to open said valve.

2. A valve in accordance with claim 1, wherein said actuator stem and said valve member are both made of synthetic plastics material, the resilience of which assists in securing frictional interengagement of said axial legs in the said groove.

3. The valve in accordance with claim 1 wherein said valve further comprises a mounting cup means 8 for receiving one end of said valve housing, said mounting cup means including an upstanding flange defining a center hole for slidably receiving and guiding said stem whereby said stem is constrained to move parallel to the center axis of said valve housing.

4. The valve in accordance with claim 1 wherein said valve member includes an interior surface inclined inwardly and downwardly to guide material entering the valve member radially inwardly toward said aperture.

5. The valve in accordance with claim 1 wherein the portion of said valve housing adjacent said inlet opening including internal axially disposed vanes forming an abutment for the said spring means, said vanes are rectangular in axial elevation and have a diagonal dimension $a$ and a thickness dimension $c$ said inlet opening defining a bore immediately below said vanes, said bore having a diameter dimension $b$ and wherein said dimensions conform to the following ratios:

$a/b = 0.4$ to $1.0$
$c/a = 0.04$ to $0.44$.

* * * * *